United States Patent [19]

Olson

[11] 4,209,493
[45] Jun. 24, 1980

[54] COMBINATION CATALYTIC CONVERTER AND MUFFLER FOR AN EXHAUST SYSTEM

[75] Inventor: David A. Olson, Stoughton, Wis.

[73] Assignee: Nelson Industries, Inc., Stoughton, Wis.

[21] Appl. No.: 683

[22] Filed: Jan. 3, 1979

Related U.S. Application Data

[63] Continuation of Ser. No. 814,697, Jul. 11, 1977, abandoned.

[51] Int. Cl.² ............................ B01J 8/02; B01J 35/04; F01N 3/15
[52] U.S. Cl. ...................................... 422/176; 60/308; 422/180
[58] Field of Search ............... 422/168, 169, 172, 176, 422/177, 179, 180, 181; 60/308; 181/2

[56] References Cited

U.S. PATENT DOCUMENTS

| | | | |
|---|---|---|---|
| 3,041,149 | 6/1962 | Houdry | 422/181 |
| 3,061,416 | 10/1962 | Kazonkas | 422/181 |
| 4,002,433 | 1/1977 | Oser | 422/176 |
| 4,050,903 | 9/1977 | Bailey et al. | 422/176 |

*Primary Examiner*—Michael S. Marcus
*Attorney, Agent, or Firm*—Andrus, Sceales, Starke & Sawall

[57] ABSTRACT

A combination muffler and catalytic converter for an exhaust system. The unit comprises an outer housing having an inlet to receive exhaust gases, and a venturi is located within the housing and provides an aspirating effect to draw air into the housing from the atmosphere for the catalytic conversion. The venturi includes a diverging conical outlet section, and the gases are discharged from the outlet section through a plurality of perforations which aids in obtaining a uniform distribution of the gases to the catalytic unit that is located centrally of the housing. After passing through the catalytic unit, the gases are discharged from the housing through a discharge pipe having a closed inner end and perforations in its wall through which the gases flow. The perforated discharge pipe provides a self-controlling system which prevents overheating of the catalyst.

10 Claims, 4 Drawing Figures

COMBINATION CATALYTIC CONVERTER AND MUFFLER FOR AN EXHAUST SYSTEM

This is a continuation of application Ser. No. 814,697, filed July 11, 1977 now abandoned.

BACKGROUND OF THE INVENTION

To control exhaust emission, catalytic conversion units are connected in exhaust systems of internal combustion engines. The typical catalytic conversion unit draws oxygen from the atmosphere and converts carbon monoxide and other undesired components, including unburned hydrocarbons, in the exhaust gas to water and carbon dioxide. In the past, the catalytic conversion units have been separate from mufflers used in the exhaust system to attenuate the accoustical energy.

One common form of catalytic conversion unit includes a ceramic monolith catalyst coated with a noble metal, and the ceramic material is a cell-like structure having a multiplicity of passages that extend through the structure. In the past, problems have been encountered in attempting to get uniform mixing of the oxygen and the exhaust gases prior to flowing the gases through the catalytic conversion unit, and a further problem has been encountered in obtaining uniform distribution of the gaseous mixture across the face of the catalyst. Accordingly, various types of baffles, deflectors, impellers, and the like have been used upstream of the catalytic conversion unit in an attempt to obtain the desired mixing of air and gases and the desired flow distribution.

A further problem that has been encountered in the past is that of overheating and possible degradation and/or failure of the catalyst. In certain exhaust gases having a high proportion of carbon monoxide the oxidation reaction results in the development of extremely high temperatures which can adversely affect or destroy the performance of the catalyst.

SUMMARY OF THE INVENTION

The invention relates to a combined muffler and catalytic conversion unit for the exhaust system of an internal combustion engine. The structure of the invention includes an outer housing having an inlet connected to the exhaust pipe of the engine, and a venturi downstream of the inlet, provides an aspirating effect to draw air into the housing from the atmosphere. In accordance with a feature of the invention, the opening in the throat of the venturi through which the air is aspirated is not exposed directly to the atmosphere, but instead communicates with the atmosphere through a tortuous or indirect passage, so that the acoustical energy will not propagate to the atmosphere.

The venturi includes a diverging conical outlet section having a plurality of perforations, and the outer end of the outlet section is partially restricted so that the major portion of the gases are discharged from the venturi through the perforations into the interior of the housing. This manner of gas discharge improves mixing and provides a uniform distribution of the gases to the catalytic unit which is located centrally of the housing. The perforated cone also aids pressure recovery of the venturi and improves the overall silencing of the combination unit.

After passing through the catalytic unit, the gases are discharged from the housing through a discharge pipe, the inner end of which is closed, and the gases flow into the discharge pipe through perforations in the side wall. The perforations provide a restricted outlet that produces a self-controlling system to prevent overheating of the catalyst. In the event excessive temperatures are generated in the catalytic unit, the volume of the gases being discharged from the unit correspondingly increases, resulting in a pressure rise downstream of the catalytic unit and thereby causing a decrease in the pressure differential at the venturi so that less air or oxygen is drawn into the unit. As less oxygen is introduced to the unit, the conversion of carbon monoxide is reduced and the temperature in the catalyst will correspondingly decrease. Thus, a natural self-regulating action is achieved which safeguards against overheating and possible degradation and/or failure of the catalytic bed.

The unit of the invention provides a reduction in the emissions as well as an attenuation of sound energy with a minimum pressure drop through the unit. With the construction of the invention, air is drawn into the venturi without allowing any substantial acoustical energy to propagate to the atmosphere and this reduces the noise level. As the opening to the throat of the venturi through which air is aspirated is not directly exposed to the atmosphere, the unit also prevents flames that may accompany an engine backfire from propagating to the outside of the unit.

The conical outlet section of the venturi having a multiplicity of perforations provides a uniform distribution of the gases to the catalytic unit without the need of auxilliary baffles, deflectors, impellers, or the like.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
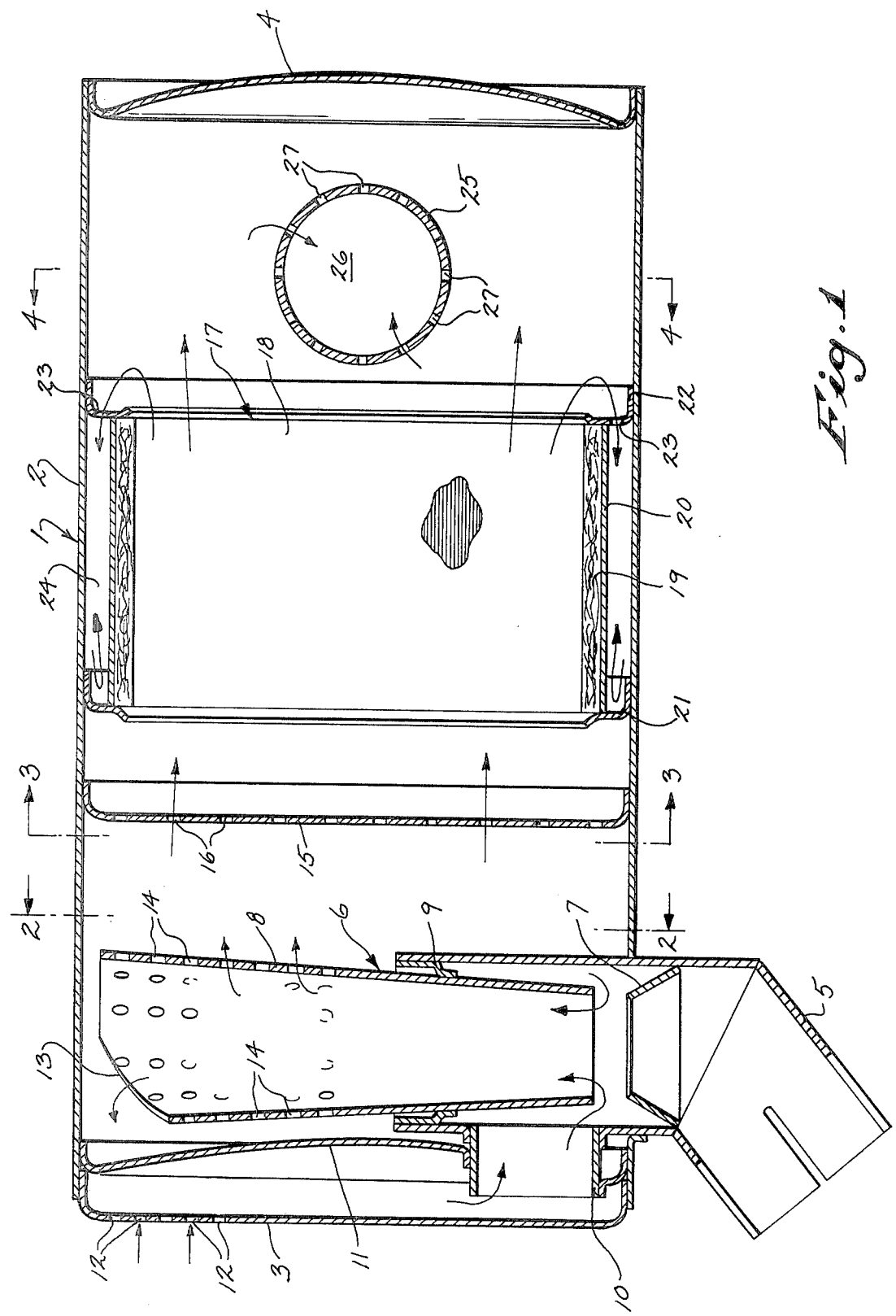
FIG. 1 is a longitudinal section of the combination muffler and catalytic conversion unit of the invention.

The drawings illustrate a combination muffler and catalytic conversion unit to be connected to the exhaust system of an internal combustion engine and has particular application to vehicles, such as fork lift trucks, which may be operated within a building or enclosure. The device includes a housing 1 composed of a generally cylindrical shell 2 having open ends enclosed by heads 3 and 4. The exhaust gases are introduced to the housing through a mitered inlet pipe 5 which is mounted within an opening in the shell 2 and is adapted to be connected to the exhaust pipe of the engine.

Mounted within the inlet pipe is a venturi 6 composed of a converging cone 7 and a diverging outlet tube 8, which are spaced apart to provide a gap or throat into which air is drawn from the atmosphere.

As shown in FIG. 1, the upstream end of cone 7 is welded to the inner surface of the inlet pipe 5 while the tube 8 is connected to the pipe through a ring 9. Tube 10 is mounted within an opening in a baffle 11 that is located in spaced parallel relation to head 3 and the tube 10 communicates with the throat of the venturi. As illustrated in FIG. 1, the outer end of the tube 10 terminates in close proximity to the head 3, and the head is provided with a series of openings or ports 12 which are spaced a substantial distance from the tube 10. Air from the atmosphere is drawn through the ports 12, through tube 10 to the throat of the venturi 6. This construction prevents direct communication between the venturi throat and the atmosphere and prevents any substantial portion of the sound energy from propagating to the atmosphere.

Figure 2:
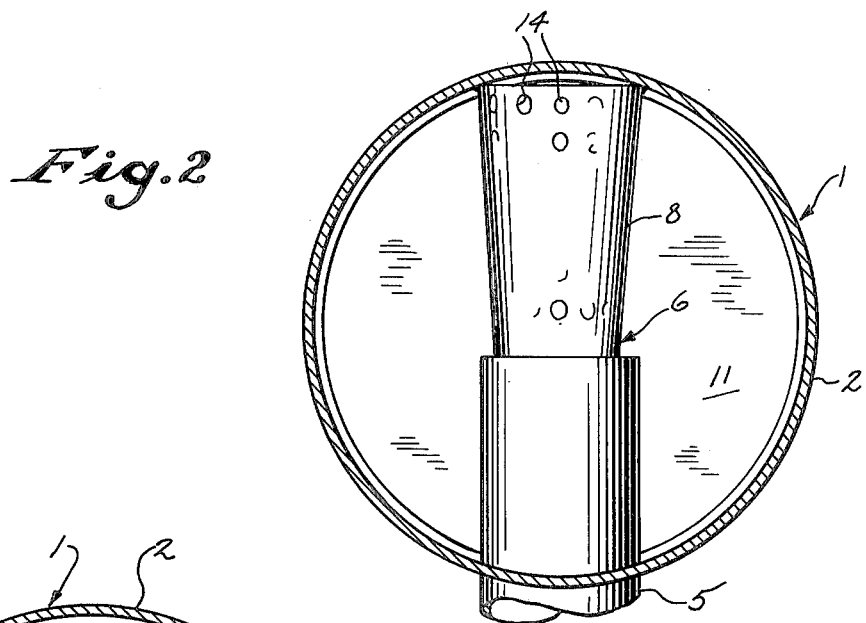
FIG. 2 is a section taken along line 2—2 of FIG. 1.
Figure 3:
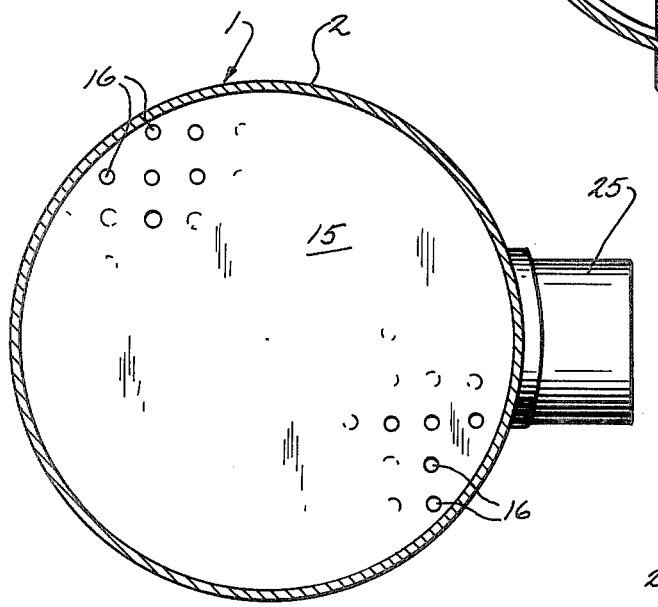
FIG. 3 is a section taken along line 3—3 of FIG. 1.
Figure 4:
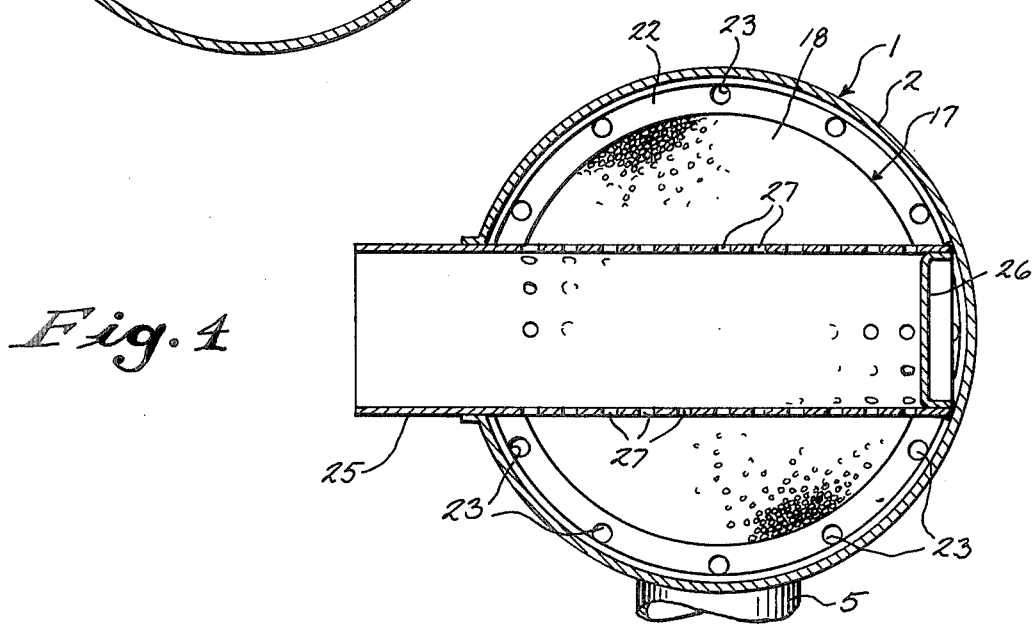
FIG. 4 is a section taken along line 4—4 of FIG. 1.

As illustrated in FIG. 2, the downstream end of the tube 8 is welded to the inner surface of the shell 2, and the end of the tube is provided with a notch 13 facing baffle 11, through which a portion of the gases are discharged into the interior of the housing 1. In addition, the downstream end portion of tube 8 is formed with holes or perforations 14 which extend completely around the circumference of tube 8. As the downstream end of tube 8 is welded to the inner surface of the housing, the passage of gas directly through the tube is restricted, with the result that the gas is discharged from the tube through the notch 13 and perforations 14. The gases are jetted through perforations 14 to increase the blending between air (oxygen) drawn in by the venturi and the exhaust gases, without any substantial pressure drop, as well as providing a more uniform distribution of the gas mixture as it flows through the housing 1.

Located downstream of the venturi 6 is a baffle 15 which extends across the shell 2 and is provided with a plurality of perforations 16 generally of the same size of the perforations 14 in the tube 8.

A catalytic conversion unit 17 is mounted downstream of the baffle 15 and is composed of a ceramic monolith catalyst 18 coated with a noble metal, such as platinum.

The catalyst is a conventional type and has a honeycomb structure with a series of passages which extend longitudinally through the monolithic structure. A layer of metal mesh 19 surrounds the catalyst 18 and provides a resilient mounting of the catalyst to the supporting casing 20. Casing 20 is mounted in spaced relation to the shell 2 of the housing 1 by a pair of flanges or rings 21 and 22. The downstream flange 22 is provided with a series of holes 23 which communicate with the closed resonating chamber 24 located between the casing 20 and the shell 2. The resonating chamber 24 acts to attenuate the acoustical energy.

As the gases pass through the catalyst, the oxygen reacts with carbon monoxide and other components in the exhaust gas to form carbon dioxide and water. After passing through the catalyst, the gases are discharged from the housing through an outlet pipe 25 which is disposed generally normal to the axis of housing 1. The inner end of the outlet pipe 25 is secured to the wall of the housing and is closed off by a plug 26. Perforations or holes 27 are formed in the wall of the outlet pipe 25 and the gases flow through the perforations into the interior of the pipe and then to the exterior.

In operation, the exhaust gases are introduced into the inlet 5 and pass through the venturi 6 to create an aspirating effect which draws air in through the ports 12 to the throat of the venturi. As the downstream end of the venturi tube 8 is restricted, the exhaust gases are discharged from the tube 8 through notch 13 and perforations 14 thereby providing an effective mixing of the oxygen and the exhaust gases.

The gas discharge arrangement from venturi tube 8 along with the perforated baffle 15, provides a uniform distribution of the gases across the face of the catalyst 18 to insure a more effective conversion of the carbon monoxide.

After passing through the catalyst, the gases flow through the perforations 27 into the outlet pipe 25 and are discharged to the atmosphere.

The unit of the invention provides a reduction in the emissions as well as attenuation of the sound energy with a minimum back pressure. The construction of the invention permits air to be drawn into the unit to provide the necessary oxygen for the catalytic conversion without allowing the acoustical energy to proagate to the atmosphere. The contruction also prevents the propagation of flames, which may accompany engine back fire, to the atmosphere.

The gas flow pattern is such that is provides a restricted outlet for the gases and produces a self-regulating system to prevent overheating and possible degradation and/or failure of the catalyst. In some instances, particularly where there are high concentrations of carbon monoxide in the exhaust gas, extremely high temperatures are generated in the catalytic unit and the volume of gases being discharged from the unit correspondingly increases resulting in a pressure rise downstream of the catalytic unit. This pressure rise causes a decrease in the pressure differential at the venturi so that less air or oxygen is drawn into the unit. As a smaller amount of oxygen is introduced into the unit, the conversion of carbon monoxide is reduced, and the temperature in the catalyst will correspondingly decrease. Therefore, the system provides a natural self-regulating action which safeguards against overheating and possible melting or degradation of the catalytic bed.

The combination catalytic conversion unit and muffler of the invention has the same space requirements as a conventional muffler, so that it can be incorporated in the same location in the exhaust system as the conventional muffler.

The venturi construction provides more effective mixing of the air and exhaust gas, better flow distribution and improved pressure recovery. The notched end of the venturi outlet section causes the gas mixture to be directed against the baffle or head 11 resulting in a more uniform distribution of the gas mixture within the housing, while the conical configuration of the outlet section of the venturi along with the perforations 14 provide a minimum pressure restriction and aid in pressure recovery as well as attenuating the sound energy.

Various modes of carrying out the invention are contemplated as being within the scope of the following claims particularly pointing out and distinctly claiming the subject matter which is regarded as the invention.

I claim:

1. A combination muffler and catalytic converter for an exhaust system, comprising a housing, inlet conduit means for introducing exhaust gas into said housing, outlet means for discharging gas from said housing, a catalytic conversion unit disposed within the housing between said inlet conduit means and outlet conduit means and being spaced therefrom, the portion of the housing located upstream of the catalytic conversion unit defining a mixing chamber, a venturi including a converging inlet section connected to and communicating with said inlet conduit means, an outlet section disposed within the mixing chamber and spaced from the catalytic unit and a throat section located between the inlet and outlet sections, at least a portion of the length of said outlet section diverging outwardly, air inlet means establishing communication between said throat section and the atmosphere, whereby air is drawn to said throat section by an aspirating action, flow restricting means adjacent the downstream end of said diverging section for restricting the flow of gas therefrom, said outlet section having a plurality of perforations disposed upstream of said flow restricting means and providing communication between the interior of the outlet section and the mixing chamber, the gases from said outlet section being discharged through said perforations into the mixing chamber, said flow restricting means enhancing the flow of gas through said perforations and into the mixing chamber to obtain improved blending of the air and exhaust gas in said chamber, the mixture of air and exhaust gas then passing through the catalytic conversion unit and being discharged through said outlet conduit means.

2. The structure of claim 1, wherein said air inlet means includes an inlet chamber disposed in said housing and communicating with said throat section, and a port in said housing and establishing communication between the inlet chamber and the atmosphere, said port being disposed out of direct line of sight with said throat section, whereby the accoustical energy cannot progagate directly from said throat section to the atmosphere.

3. The structure of claim 1, wherein said perforations extend around the entire periphery of said outlet section of the venturi.

4. The structure of claim 1, wherein the axis of said outlet section of said venturi is disposed generally normal to the axis of said housing and the downstream end of said outlet section is connected to the wall of said housing, said wall partially closing off the downstream end of said outlet section and constituting said flow restricting means.

5. The structure of claim 4, wherein the downstream end of said outlet section is provided with a notch disposed adjacent said wall for the discharge of gas from said downstream end.

6. The structure of claim 5, wherein said notch faces in a direction away from said catalytic conversion unit.

7. The structure of claim 1, and including a wall disposed within said housing, said housing and said wall defining an air inlet chamber that constitutes a portion of said air inlet means, said air inlet means also including a passage providing communication between the throat section of the venturi and said air inlet chamber, and said air inlet means also including a plurality of ports in said housing and providing communication between said air inlet chamber and the atmosphere, said ports being disposed out of direct alignment with said passage, whereby acoustical energy cannot propagate directly from said throat section of the venturi to the atmosphere.

8. The structure of claim 7, wherein the axis of said venturi is disposed generally normal to the axis of said housing and said wall is spaced from an end of said housing, whereby said air inlet chamber is defined by said wall and the end of said housing, said passage extending through said wall.

9. The structure of claim 8, wherein said ports are disposed in said end of the housing.

10. The structure of claim 9, and including a tube extending through said wall and defining said passage, the outer end of the tube terminating in proximate relation to said end of the housing.

* * * * *

UNITED STATES PATENT AND TRADEMARK OFFICE
CERTIFICATE OF CORRECTION

PATENT NO. : 4,209,493
DATED : June 24, 1980
INVENTOR(S) : DAVID A. OLSON

It is certified that error appears in the above-identified patent and that said Letters Patent are hereby corrected as shown below:

Column 1, Line 4, CLAIM 1, Cancel "diverging" and substitute therefor ---outlet---

Signed and Sealed this

Twenty-eighth Day of October 1980

[SEAL]

Attest:

SIDNEY A. DIAMOND

Attesting Officer

Commissioner of Patents and Trademarks